United States Patent [19]

Manzer

[11] Patent Number: 5,784,998
[45] Date of Patent: Jul. 28, 1998

[54] AUTOMATIC FILLING AND FLUSHING VALVE ASSEMBLY FOR BOWL

[76] Inventor: Marvin Rupert Manzer, 2400 Sunset Strip, Hixson, Tenn. 37343

[21] Appl. No.: 758,176

[22] Filed: Nov. 25, 1996

[51] Int. Cl.⁶ .................................................. A01K 7/00
[52] U.S. Cl. ............................................................ 119/69.5
[58] Field of Search .............................. 119/69.5, 72, 74, 119/75, 78

[56] References Cited

U.S. PATENT DOCUMENTS

| | | | |
|---|---|---|---|
| 3,823,692 | 7/1974 | Bowser | 119/78 |
| 3,995,591 | 12/1976 | Garwood | 119/69.5 |
| 4,630,569 | 12/1986 | Dieleman | 119/69.5 |
| 5,052,343 | 10/1991 | Sushelnitski | 119/74 X |

Primary Examiner—Thomas Price
Attorney, Agent, or Firm—Chambliss, Bahner & Stophel, P.C.

[57] ABSTRACT

A valve assembly for a bowl includes a housing having a liquid-tight bulkhead at its base, so that the housing and the bulkhead define a chamber for containing liquid. The housing has a plurality of holes that are located above the bulkhead and positioned so that liquid in the chamber may flow through the holes and into the bowl. A supply tube, connected to an external source of the liquid, has an opening into the chamber for passage of the liquid from the external source into the chamber. A valve is adapted to be moved from an open position, which permits the flow of liquid from the external source into the chamber, to a closed position which stops the passage of liquid from the external source. A float within the chamber will rise and fall depending on the level of liquid in the chamber. The float is attached to the valve so that a rise in the liquid level in the chamber which raises the float to a predetermined level corresponding to the desired level of liquid in the bowl will tend to move the valve from an open position to a closed position. Closing of the valve is retarded as the liquid level in the chamber reaches the predetermined level by providing a cap for the housing having a vent hole. The cap is adapted to mate with the housing so as to permit the air in the chamber above the liquid level to be compressed as the level of liquid rises. The vent hole is sized so as to permit the air above the liquid level in the chamber to be vented from the chamber at a controlled rate as the air is compressed to retard the closing of the valve for a predetermined period so as to permit the liquid to flow into the bowl in a quantity greater than that required to fill the bowl to the desired level. A predetermined quantity of the liquid will overflow the bowl when the valve is actuated and before the valve is moved to a closed position.

20 Claims, 8 Drawing Sheets

5,784,998

AUTOMATIC FILLING AND FLUSHING VALVE ASSEMBLY FOR BOWL

FIELD OF THE INVENTION

The invention relates to a valve assembly for a bowl that is adapted to contain a liquid. More specifically, the preferred embodiment of the invention is a valve assembly for a bowl that is adapted to contain water, such as a birdbath or an animal watering bowl. The invention provides a valve assembly that permits automatic filling of the bowl, which filling may be accompanied by overfilling of the bowl at a controlled rate so as to provide a flushing action for the bowl.

BACKGROUND OF THE INVENTION

Birdbaths provide an attractive complement to residential homes, and they help promote an interest in, and the wellbeing of, wild birds. A local bird population will remain faithful to a particular area if a ready source of water and food is available. Consequently, birdbaths are quite popular in many areas.

Commercially available birdbaths typically comprise a bowl portion that is mounted on a pedestal. Most such birdbaths are relatively inexpensive products that are made of concrete or plastic material and which include no plumbing fixtures or other means for filling them with water. Consequently, the homeowner typically is required to carry water to the birdbath or to employ a garden hose to fill the birdbath bowl. In addition, water will evaporate from the birdbath over time, and as birds visit the bird bath, water may be splashed out. Both occurrences require replacement or replenishment of water in the bowl. Furthermore, in time, the water in the bowl may accumulate dirt, feathers, and leaves from nearby trees or shrubbery. Consequently, it is frequently necessary to add water to the bowl, and often desirable to clean it as well. This usually requires that the homeowner carry water to the birdbath or use a garden hose to refill it and\or to flush it out. However, more expensive birdbath models are also available which include fountains that provide a continuous flow of water to the bowl. These fountain-type birdbaths are quite expensive to purchase and to operate, and their constant flow of water may be wasteful. In addition, birds generally prefer calm water in a birdbath, rather than running water, and so while a fountain-type birdbath may relieve the homeowner of the chore of refilling the birdbath, it may not attract many birds.

In addition, owners of pets and livestock may also find it convenient to provide and maintain bowls or troughs to provide drinking water for such animals at locations remote from a convenient source of water. Furthermore, homeowners having small man-made fish ponds or bowls may also find it convenient to provide water for such ponds or bowls at remote locations. The water in such troughs, bowls or ponds is also subject to evaporation, as well as consumption, and it may become contaminated with dirt and other foreign matter. If the watering bowl is a small portable one, such as may be provided for a cat or small dog, it is relatively easy to carry it to a sink for refilling and cleaning; however, if it is a large one, such as may be provided for large dogs or livestock, it may not be convenient or even reasonably possible to move the bowl or trough. Finally, if it is an exterior fish pond, it will be necessary to provide some means for carrying or supplying additional water at the pond location. In such cases, the owner of the animals will be required to carry water to the pond, bowl or trough, or to use a garden hose to maintain a fresh supply of water.

In addition, there are various processes involving water and other liquids in which a bowl containing the liquid must be replenished from time to time, and in which it may desirable to overflow the bowl as the liquid is replenished.

It would be desirable if a valve assembly could be provided for automatically refilling the bowls of birdbaths, watering troughs and other bowls which are provided for containing water and other liquids. It would also be desirable if such valve assembly could be provided in a form that is economical to buy and operate. Furthermore, it would be desirable if the normal operation of such valve assembly included overflowing the bowl periodically and automatically in a controlled fashion in order to clean or flush out the bowl, as well as permitting manually controlled overflowing as deemed necessary or desirable by the user.

OBJECTS AND ADVANTAGES OF THE INVENTION

Accordingly, it is an object of the invention claimed herein to provide a valve assembly that automatically operates to refill the bowls of birdbaths, watering troughs and other bowls which are provided for containing water and other liquids. It is another object of this invention to provide such a valve assembly that is economical to buy and to operate. Another object of this invention is to provide a valve assembly that may be operated in an automatic mode to periodically overflow the bowl in a controlled fashion in order to clean or flush out the bowl. Still another object of this invention is to provide a valve assembly that may also be operated in a manual mode to overflow the bowl according to the desires of the user.

Additional objects and advantages of this invention will become apparent from an examination of the drawings and the ensuing description.

SUMMARY OF THE INVENTION

A valve assembly is provided, which assembly is adapted to be mounted in a bowl that is adapted to contain a liquid. The valve assembly includes a housing, a supply tube, a valve seat and a valve, a float, means for attaching the float to the valve and means for retarding the closing of the valve. The housing has a liquid-tight bulkhead at the base thereof, said housing and bulkhead defining a chamber for containment of the liquid. The housing also has a plurality of holes, each of which is located above the bulkhead and positioned so that the liquid in the chamber may flow through the holes and into the bowl. The supply tube is adapted for connection to an external source of the liquid, said tube having an opening therein that is located within the chamber for passage of the liquid from the external source into the chamber. The valve seat is in fluid communication with the supply tube and located between the connection to the external source of the liquid and the opening for passage of the liquid into the chamber. The valve is seated in the valve seat and adapted to be moved from an open position, which permits the flow of the liquid from the external source through the supply tube and through the opening therein into the chamber, to a closed position which stops the passage of the liquid from the external source through the opening in the supply tube. The float is adapted to rise and fall within the chamber depending on the level of the liquid in the chamber. The float is attached to the valve by attachment means so that a rise in the level of liquid in the chamber which raises the float to a predetermined level corresponding to the desired level of liquid in the bowl will tend to move the valve from an open position to a closed position. The closing of the valve is retarded by retarding means as the liquid level in the chamber reaches the predetermined level therein corresponding to the desired level of the liquid in the bowl. The retarding means includes a cap for the housing having a vent hole therethrough. The cap is adapted to mate with the housing so as to permit the air in the chamber above the liquid level to be compressed as the level of liquid rises therein, and the vent hole is sized so as to permit the air above the liquid level in the chamber to be vented from the chamber at a controlled rate as the air is compressed to retard the closing of the valve for a predetermined period. This retarding action permits the liquid to flow into the bowl in a quantity greater than that required to fill the bowl to the desired level so that a predetermined quantity of the liquid will overflow the bowl when the valve is actuated to permit the flow of the liquid to the bowl and before the valve is closed.

In order to facilitate an understanding of the invention, the preferred embodiment of the invention is illustrated in the drawings, and a detailed description thereof follows. It is not intended, however, that the invention be limited to the particular embodiment described or to use in connection with the apparatus illustrated herein. Various modifications and alternative embodiments such as would ordinarily occur to one skilled in the art to which the invention relates are also contemplated and included within the scope of the invention described herein.

BRIEF DESCRIPTION OF THE DRAWINGS

A preferred embodiment of the invention is illustrated in the accompanying drawings, in which like reference numerals represent like parts throughout, and in which.

DESCRIPTION OF THE PREFERRED EMBODIMENTS

Figure 1:
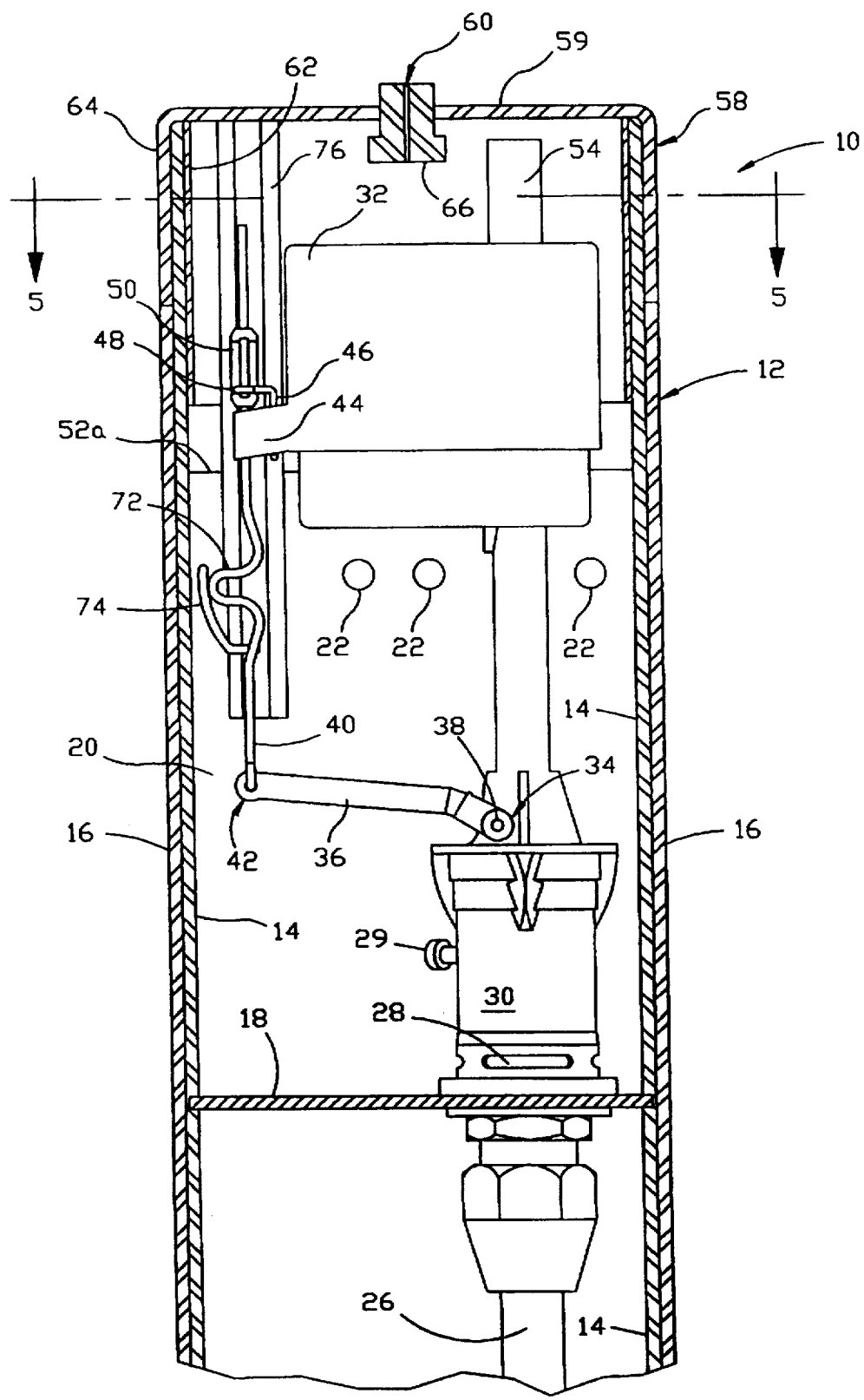
FIG. 1 is a sectional view of a preferred embodiment of the invention, illustrating the configuration of the invention in the automatic mode with the valve in a closed position.

Referring now to the drawings, FIGS. 1, 2, 4 and 5 illustrate a preferred embodiment of the invention, a valve assembly that is adapted to be mounted in a bowl which is adapted or configured to contain a liquid such as water. Such valve assembly provides for automatic filling of the bowl, which filling may be accompanied by overfilling of the bowl at a controlled rate so as to provide a flushing action for the bowl, and therefore, it may be useful in connection with any bowl where such action is desired. Such bowls may include birdbath bowls, animal watering bowls, fish ponds and other bowls adapted for containing water and other liquids. As used herein, therefore, the term "bowl" may be considered to include bowls, troughs, ponds and other containers adapted for holding or containing water or other liquids. Furthermore, the invention may be suitable for use in connection with various processes involving water and other liquids, where automatic overfilling of the bowl at a controlled rate, so as to provide a flushing action, is desired. The embodiments of the invention described herein are particularly useful in connection with bowls for containing water or another liquid that is not caustic and neither strongly acidic or basic. If other liquids are involved, the structures of the invention and the materials from which such structures are made may need to be adapted in ways known to those having ordinary skill in the art to which the invention relates to accommodate such uses.

Referring again to the drawings, valve assembly 10 is illustrated. This preferred assembly is especially adapted for use in connection with bowls for containing water. Assembly 10 includes housing 12, comprised of inner wall 14 and outer wall 16, that is provided in a generally cylindrical configuration. Preferably the components of the housing are comprised of rigid PVC. At the base of the housing is located water-tight bulkhead 18, preferably made of aluminum. Together the housing and bulkhead define a chamber 20 for containment of water. The housing has a plurality of holes 22 through the inner and outer walls, each of which is located above the bulkhead and positioned so that water in the chamber may flow through the holes and into a bowl such as bowl 23 of birdbath 24 of FIG. 4. Preferably, these holes in the housing are located below the desired water level 25 (see FIG. 4) of the bowl, and are spaced at regular intervals around the housing.

As will be appreciated by those having ordinary skill in the art to which the invention relates, portions of the invention are adapted from an ordinary household toilet valve, such as the Fluidmaster® Model 200A that is made by Fluidmaster, Inc., of Anaheim, Calif. This toilet valve is described in U.S. Pat. No. 4,327,941, and the description thereof is incorporated herein by reference. The valve assembly also includes a supply tube (not shown), which is adapted for connection to an external source of water through pipe 26 in a manner known to those skilled in the art to which the invention relates. The supply tube has an opening therein, which is in fluid communication with lower ports 28, which opening is located within the chamber for passage of water from the external source into the chamber. The opening in the supply tube is also in fluid communication with upper port 29, from which a relatively small amount of the water flowing from the supply tube may enter the chamber; however, upper port 29, which is important in the operation of a toilet valve, is of insignificant importance in the operation of the invention.

The valve assembly also includes a valve seat (not shown) that is in fluid communication with the supply tube and located between the connection to the external source of water and the opening for passage of water into the chamber. A valve (also not shown) is seated in the valve seat and adapted to be moved from an open position, which permits the flow of water from the external source through the supply tube and through the opening therein into the chamber, to a closed position which stops the passage of water from the external source through the opening in the supply tube. The supply tube, opening in the supply tube, valve seat and valve of this embodiment of the invention are located in valve housing 30, and these components, along with ports 28, which are preferably space around housing 30, and port 29, are components of a common toilet valve, as has been previously mentioned. Furthermore, the operation and the cooperation of these components is as designed for the common toilet valve. Such components and their manner of operation may easily be understood and duplicated, therefore, by those having ordinary skill in the art to which the invention relates.

Assembly 10 also includes float 32, which is adapted to rise and fall within the chamber depending on the level of water in the chamber. Furthermore, because of fluid communication between the chamber and the bowl through holes 22, the level of water in the chamber will correspond to the level of water in the bowl. Therefore, float 32 will rise and fall in the chamber with changes in the level of water in the bowl.

Valve assembly 10 also includes means for attaching the float to the valve so that a rise in the water level in the chamber which raises the float to a predetermined level corresponding to the desired level of water in the bowl will tend to move the valve from an open position to a closed position. Preferably, the valve is pivotally attached at first end 34 of elongate arm 36, so that the arm may be pivoted through a range from a lower position (shown in FIG. 2) in which the valve is open to an upper position (shown in FIG. 1) in which the valve is closed. As will be appreciated by those having ordinary skill in the art to which the invention relates, pivoting arm 36 is attached to the valve (not shown) within valve housing 30, and is adapted to pivot about pivot point 38 and thereby to pivot the valve in the valve seat within its housing. Connecting rod 40 is attached at one end thereof (at its lower end as viewed in FIGS. 1, 2 and 3) to the second end 42 of arm 36 and at the other end thereof (the upper end as viewed in FIGS. 1, 2 and 3) to the float, so that a rise in the water level in the chamber which raises the float will raise the arm from the lower position which corresponds to an open position of the valve (FIG. 2) to an upper position which corresponds to a closed position of the valve (FIG. 1). Connecting rod 40 is preferably attached in a sliding relationship with connecting appendage 44 of float 32. Connecting link 46, having an upper loop 48 that encircles the connecting rod, is also connected to appendage 44, and clamp 50, which is also in sliding engagement with rod 40, may be adjustably placed in position over link 46, to fix its position with respect to rod 40. Link 46 is not supplied in connection with the common toilet valve, but is included as a part of the preferred embodiment of the invention in order to place clamp 50 above appendage 44. This permits easier access to the clamp when the assembly is used in a relatively small chamber, so that the clamp can be squeezed to move it along connecting rod 40. In addition, rod 40 has been substantially modified from the connecting rod supplied with the common toilet valve assembly; however, the connections of the rod to the pivoting arm 36 and to float 34 (other than link 46) are preferably substantially the same as used in the common toilet valve.

The cooperation of rod 40, connecting link 46 and clamp 50 may be employed to change the relative position of the float along connecting rod 40, and thereby to select a water level in the chamber at which the valve will open to permit a flow of water from the supply line into the chamber through ports 28. A predetermined level of water in the chamber may thereby be selected to correspond to the desired level 25 of water in the bowl, and when such level is selected, the valve assembly may be employed to maintain the water in the bowl at the desired level. Preferred results are obtained when the float is positioned along the connecting rod at a point such that the water level in the bowl will be maintained at approximately one-quarter inch below the lip of the bowl. As shown in FIG. 1, float 32 is positioned in chamber 20 at water level 52a, corresponding to the desired level of water in the bowl, and consequently, at a level at which the valve will be in a closed position. When the level of water in the bowl falls below the predetermined level, the valve assembly may be actuated to open the valve to supply additional water. Thus, for example, levels 52b of FIG. 2 and 52c of FIG. 3 correspond to levels of water in the chamber at which the valve will be in open positions.

Valve assembly 10 preferably includes guide rod 54 which cooperates with float 32 to maintain the float in vertical alignment within the chamber. This may be accomplished by providing the float with a channel 56 that extends through the float, and by disposing and aligning the guide rod within the channel in sliding relationship therewith.

Valve assembly 10 also includes means for retarding the closing of the valve as the water level in the chamber reaches the predetermined level therein corresponding to the desired level of water in the bowl. This retarding means includes cap 58 for the housing having vent hole 60 therethrough. The cap is adapted to mate with the housing so as to permit the air in the chamber above the water level to be compressed as the level of water rises therein. As shown in the drawings, cap 58, includes end wall 59 (not shown in FIG. 5), inner cap sidewall 62 and outer cap sidewall 64. The cap is preferably adapted to mate with assembly housing 12 so that inner wall 14 of the housing is aligned between the inner and outer cap sidewalls. Preferably, the cap assembly is comprised of rigid PVC and arranged so that the outer cap sidewall aligns with and fits flush with the top portion of outer wall 16 of assembly housing 12. Vent hole 60 is sized so as to permit the air above the water level in the chamber to be vented from the chamber at a controlled rate as the air is compressed by the rising water in the chamber. The vent hole is sized, therefore, so as to delay the equalization of the air pressure in the chamber. This controlled venting of air from the chamber will maintain a compression force on the upper surface of float 32, and on the surface of the water in the chamber, as the water rises therein. This force will act to retard the closing of the valve for a predetermined period so as to permit water to flow into the bowl in a quantity greater than that required to fill the bowl to the desired level so that a predetermined quantity of water will overflow the bowl when the valve is actuated to permit the flow of water to the bowl and before the valve is moved to a closed position. The rate and duration of overflow will depend on the size of the chamber, the volume of the chamber, the volume of water at the desired level in the bowl, the volume of the airspace at the top of the chamber, the water supply pressure and the size of the vent holes and the holes for passage of the water from the chamber. Generally, good results have been obtained when the vent hole is sized with a diameter within the range of about 0.010–0.05 inches. For a birdbath bowl of average size, having a diameter of about eighteen inches and a semispherical or concave bottom, when the valve assembly is mounted in a chamber of four-inch diameter, and water is supplied at ordinary household pressure (typically 50–60 psi), preferred results may be obtained if the total area of the outflow holes from the chamber is within the range of 0.15–0.5 square inches and the vent hole is sized within the range of about 0.015–0.03 inches in diameter. Best results may be obtained for such a bowl and valve assembly, if the area of outflow is within the range of about 0.25–0.4 square inches and the vent hole is provided having a diameter of about 0.017–0.025 inches.

Figure 4:
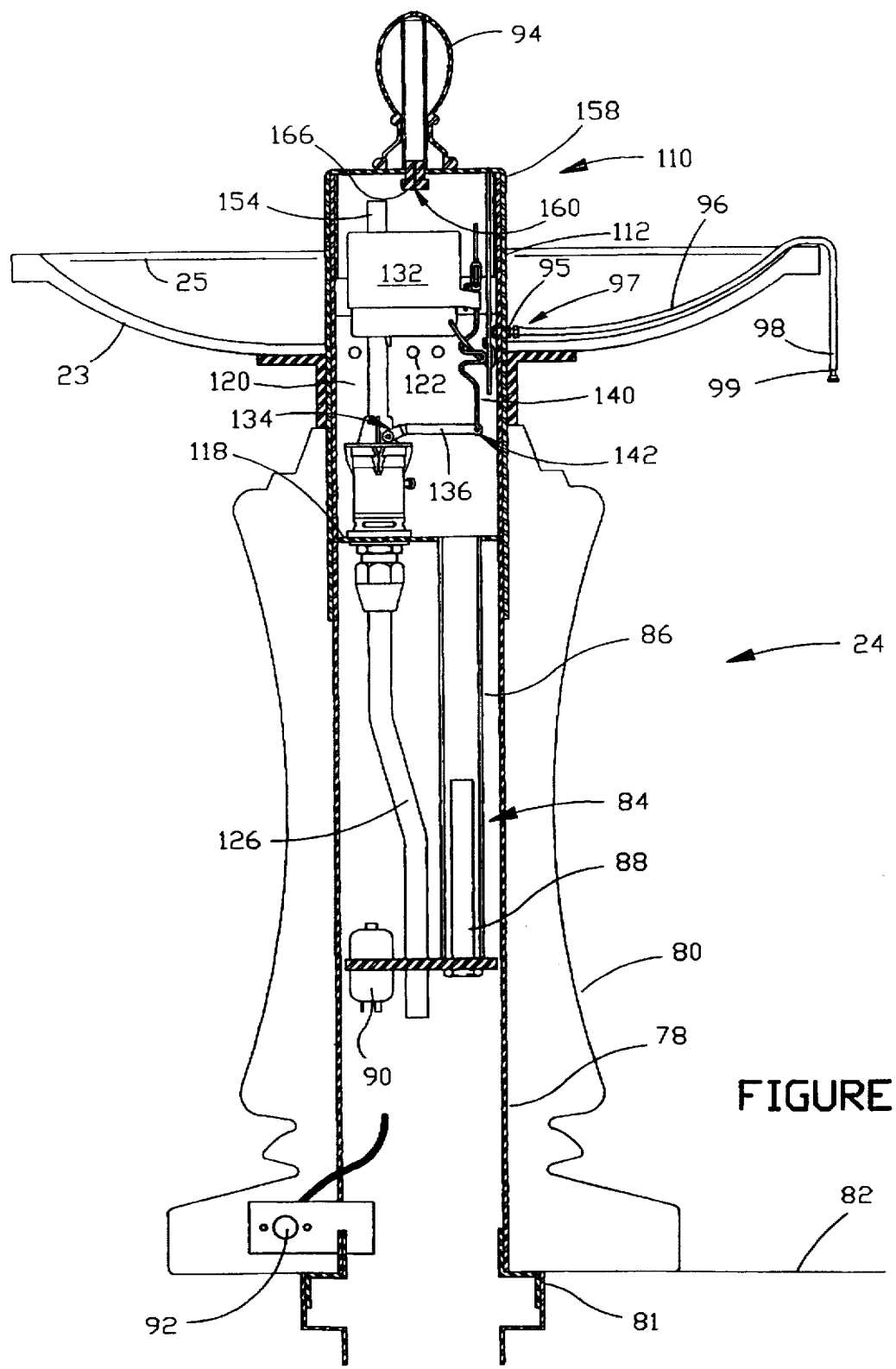
FIG. 4 is a sectional view of an embodiment of the invention illustrating the use of the valve assembly in connection with a birdbath.
Figure 6:
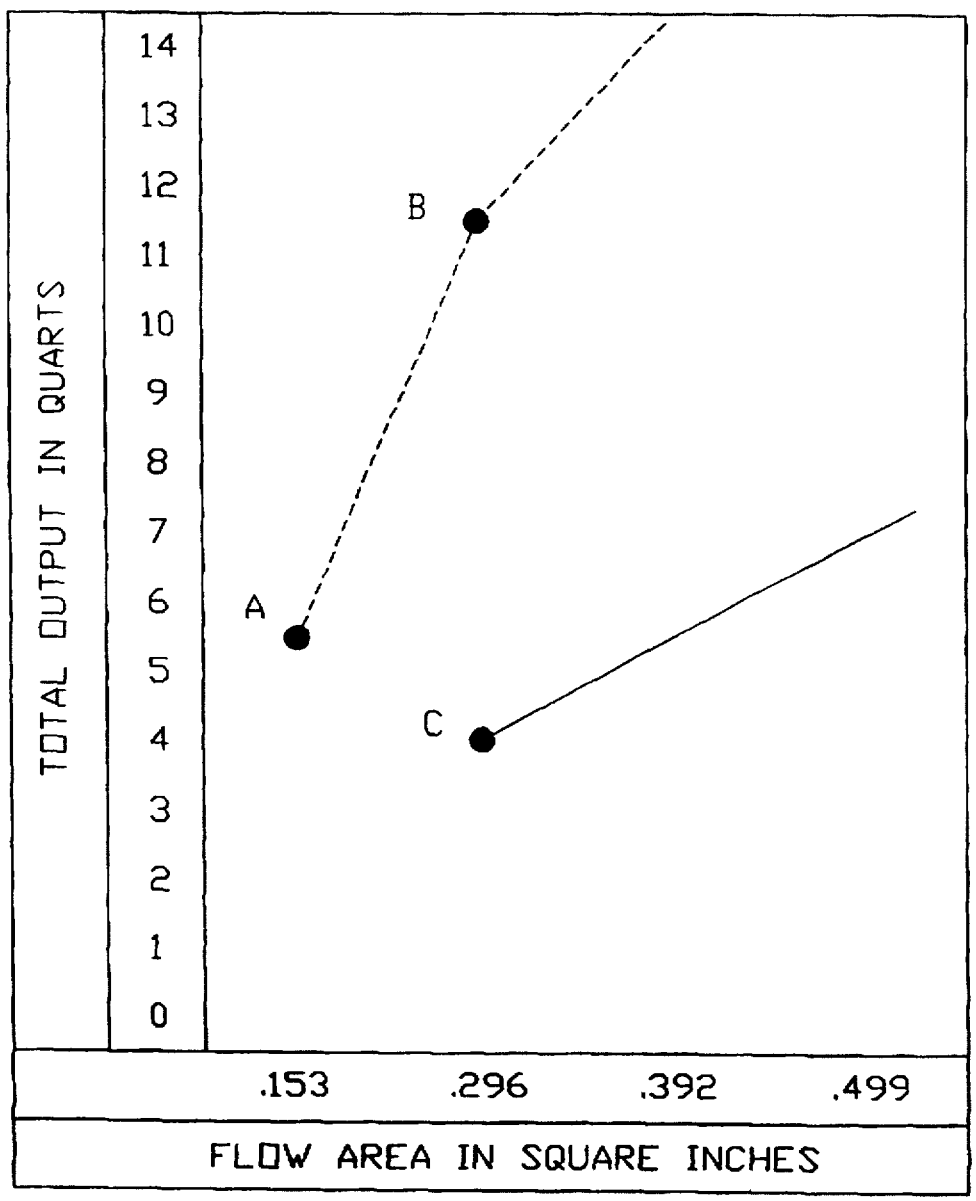
FIG. 6 is a graph showing the relationship among the vent hole diameter of the invention, the flow area out of the chamber and the total output or throughput of liquid from the chamber in the operation of the invention.
Figure 7:
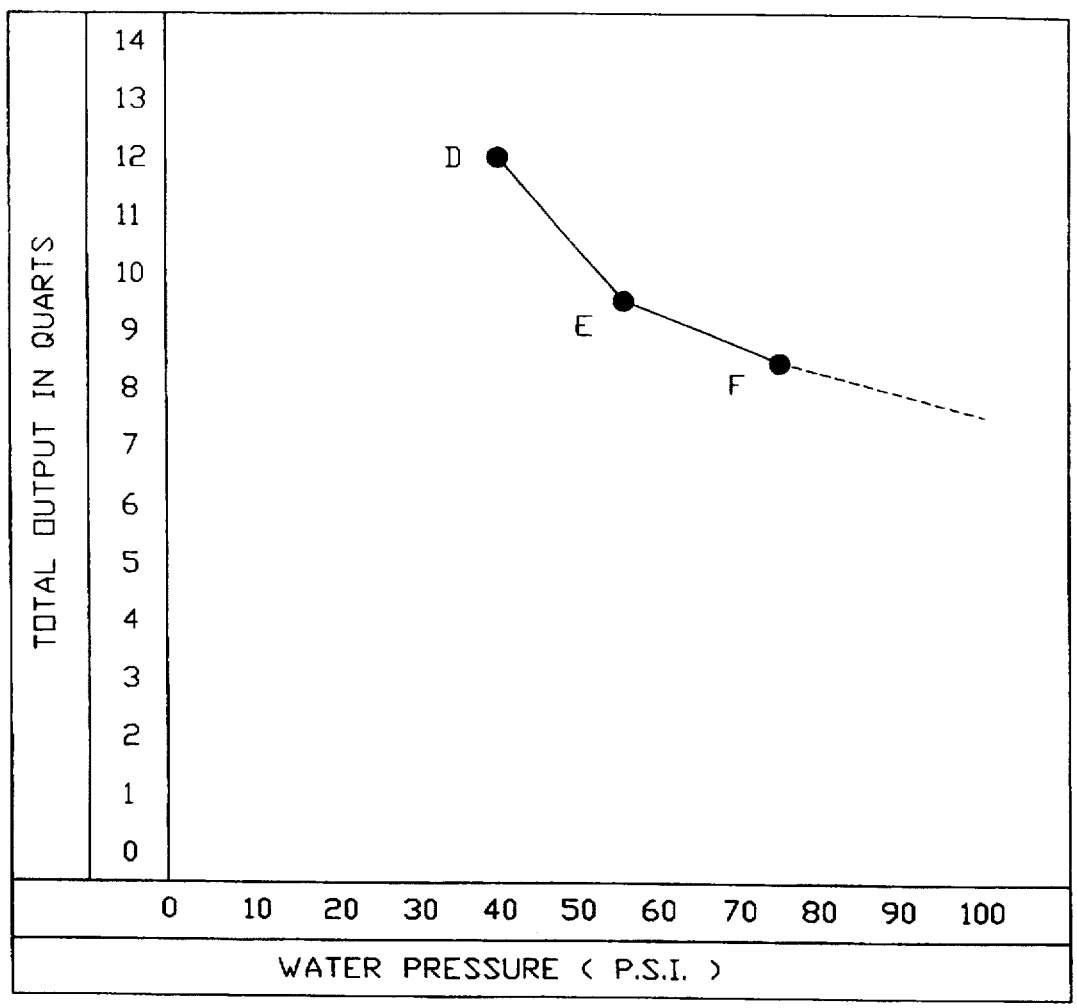
FIG. 7 is a graph showing the relationship between the supply pressure and the total output or throughput of liquid from the chamber in the operation of the invention for a particular vent hole size.

FIGS. 6 and 7 show the preferred relationship between and among some of the various factors that affect the rate and duration of overflow according to the invention, when used in connection with the preferred embodiment of FIG. 4, wherein the valve assembly is mounted in a four-inch diameter chamber having a total chamber height of about nine inches. Referring now also to FIG. 4, the size of holes 122 may be selected, along with the size of vent hole 160, and with the supply pressure, to control the amount and duration of the overflow out of the chamber into the bowl, and out of the bowl. Generally, the larger the holes 122 out of the chamber, the greater the overflow, although as will be seen, the supply pressure and the size of vent hole 160 are also important.

In tests conducted with an apparatus such as is identified above, eight holes 122 were provided through the walls of the chamber. In a first test, eight holes 122 were provided, each with a diameter of 5/32 inch to provide a total outflow area of 0.153 square inches. The supply pressure was 60 psi, and the vent hole 160 was sized at 0.017 inch in diameter. The measured total output of water from the chamber into and out of the bowl was approximately 5.8 quarts, as indicated in FIG. 6 by data point A. In a second test, the eight holes were sized each with a diameter of 7/32 inch to provide a total outflow area of 0.296 square inches. The supply pressure and the vent hole size remained the same as in the first test, and the measured total output of water from the chamber into and out of the bowl was approximately 11.2 quarts, as indicated in FIG. 6 by data point B. In a third test, the eight holes were sized each with a diameter of 7/32 inch to provide a total outflow area of 0.296 square inches. The supply pressure was 60 psi and the vent hole size was increased to 0.025 inch in diameter. The measured total output of water from the chamber into and out of the bowl was approximately 4.2 quarts, as indicated in FIG. 6 by data point C. Although he has not run additional tests of this type, the inventor believes that the lines shown on FIG. 6 can be used to predict the total output of water from the chamber into and out of the bowl for the various flow areas and vent hole sizes shown, when the invention is operated with a supply pressure of 60 psi.

FIG. 7 shows the relationship between the supply pressure and the total output or throughput of water from the chamber in the operation of the invention in connection with the preferred embodiment of FIG. 4 wherein the valve assembly is mounted in a four-inch diameter chamber having a total chamber height of about nine inches. In tests conducted with such an apparatus, eight holes 122, each having a diameter of 7/32 inch, were provided through the walls of the chamber. Vent hole 160, with a diameter of 0.025 inch, was provided through cap 158. The water supply pressure was controlled with a restricted regulator. In a first test, the supply pressure was set at 40 psi, and the total output of water from the chamber was measured at about 12.0 quarts, as indicated in FIG. 7 by data point D. In a second test, the water supply pressure was set at 55 psi, and the total output of water from the chamber was measured at about 9.5 quarts, as indicated in FIG. 7 by data point E. In a third test, the water supply pressure was set at 75 psi, and the total output of water from the chamber was measured at about 8.5 quarts, as indicated in FIG. 7 by data point F. Although additional tests of this type have not been run, the inventor believes that the lines shown on FIG. 7 can be used to predict the total output of water from the chamber into and out of the bowl for the given flow area and vent hole size at the various supply pressures shown.

Figure 2:
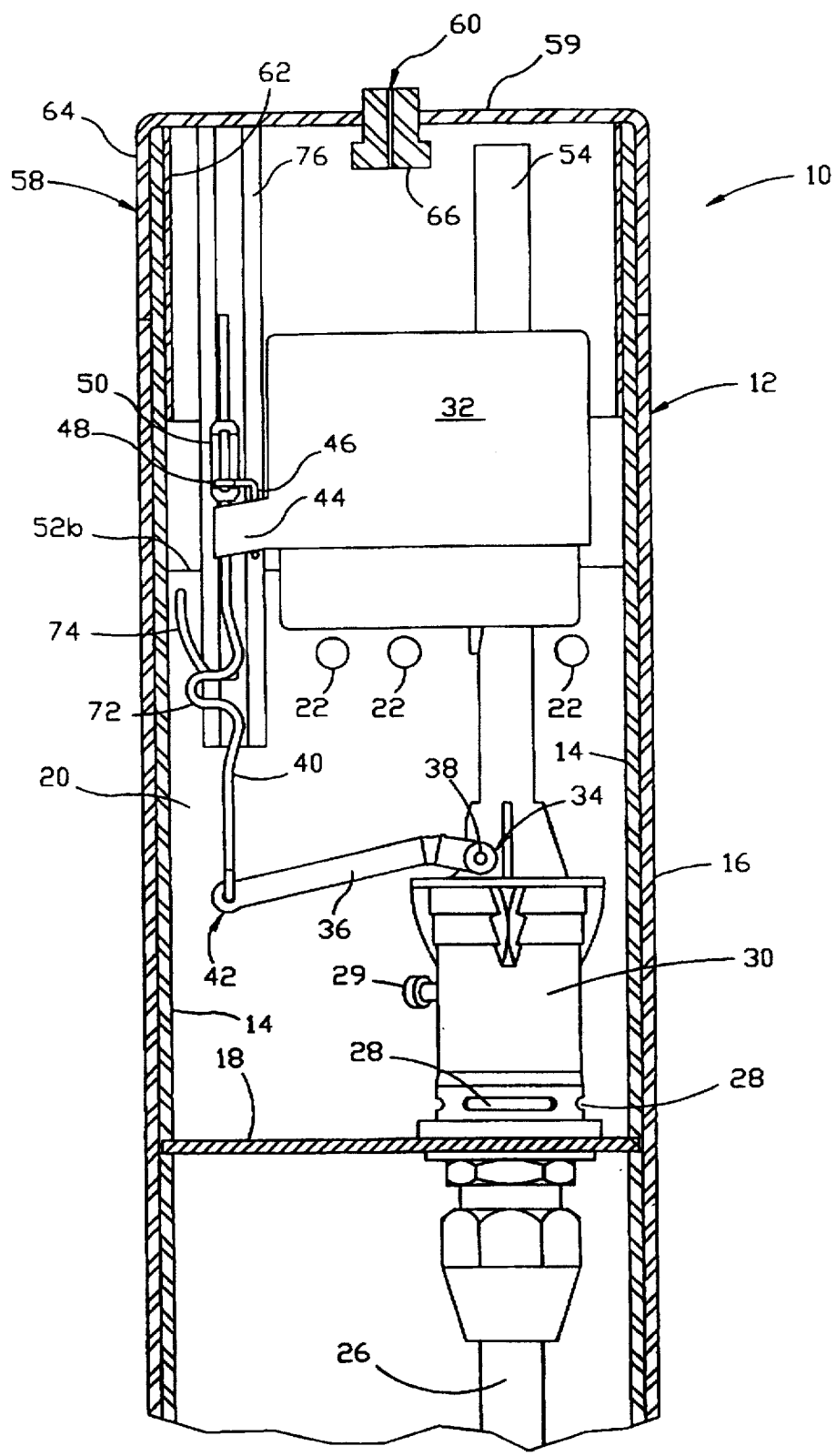
FIG. 2 is a sectional view of the embodiment of FIG. 1, illustrating the configuration of the invention in the automatic mode with the valve in an open position.
Figure 3:
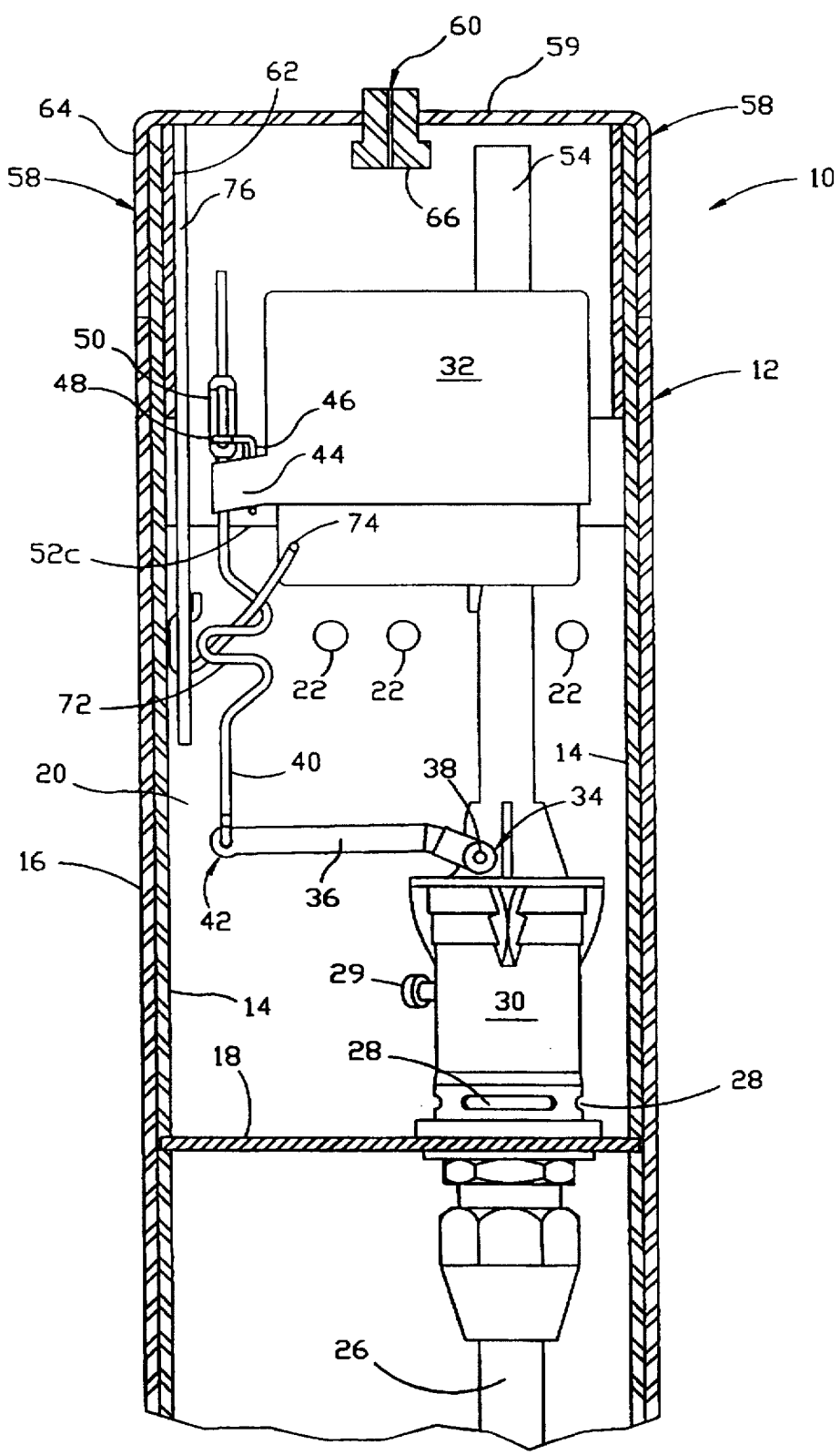
FIG. 3 is a sectional view of the embodiment of FIG. 1, illustrating the configuration of the invention in the manual mode with the valve in an open position.
Figure 8:
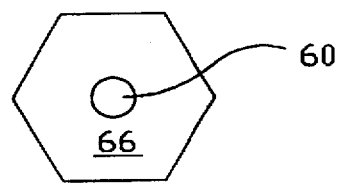
FIG. 8 is a top view of the plug of a preferred embodiment of the invention.
Figure 9:
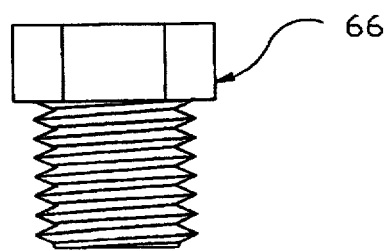
FIG. 9 is a side view of the plug of FIG. 8.

Referring now to FIGS. 1, 2 and 3, it is preferred that the cap end wall 59 be provided with a threaded central hole, and that a threaded plug such as plug 66 (FIGS. 8 and 9) and containing the vent hole be adapted to fit within the central hole. If such an arrangement is used, a standard sized valve assembly may be used with bowls of various sizes, and a plurality of plugs having differently sized vent holes may be provided to accommodate the various sized bowls. In addition, if it is desired to eliminate the controlled, delayed venting of the chamber that permits the bowl to overflow, the plug containing the vent can simply be removed to allow the air pressure in the chamber to equalize very rapidly, and thereby to avoid the retarding action on the closing of the valve.

It is also preferred that the inside surface of the outer sidewall is provided with a relief groove or channel that is adapted to permit air to enter the chamber when the valve is in the closed position. This prevents any change in external atmospheric pressure conditions from impeding the normal operation of the valve assembly. Preferably this groove 68 (see FIG. 5) may be provided in a location in communication with a relief hole 70 through the inner wall 14 of the valve assembly housing.

Figure 5:
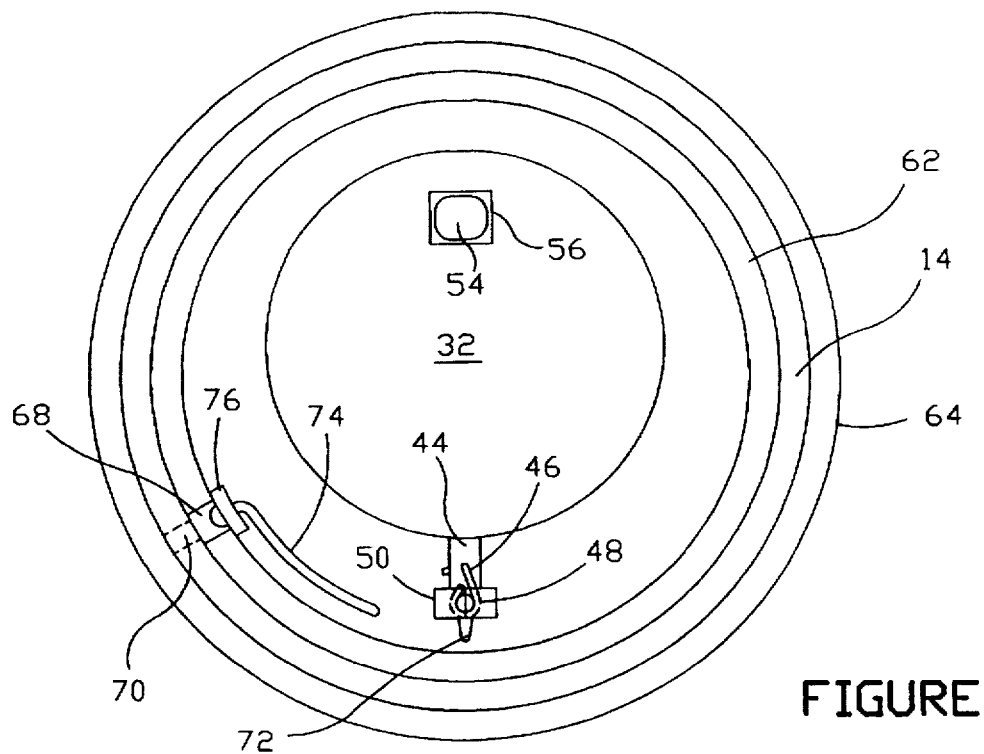
FIG. 5 is a top view of the valve assembly of FIG. 1, with the end wall of the cap deleted, and including sectional line 1—1.

The preferred valve assembly illustrated in the drawings is also provided with a valve-actuating means for manually opening the valve to permit a flow of water into the bowl. This feature of the invention will be useful for the situations in which the water level in the bowl is at the desired level, but there are leaves or other debris in the bowl. This feature will permit a user to manually open the valve in the valve assembly to permit water to run into the bowl in order to overflow the bowl and flush away the leaves or debris. The user may also wish to operate the manual valve-actuating means to overflow the bowl in order to irrigate the area around the bowl, so as, for example, to water flowers that may be planted around the bowl. The manual valve-actuating means includes an appendage 72 in the connecting rod at a medial location along the length thereof. In addition, a valve-actuating rod 74 is provided that is attached to the cap, preferably in the form of a stiff wire that is threaded through a pair of holes and secured to holding block 76, which block is glued or otherwise secured to the inner cap sidewall 62. The valve-actuating rod is mounted to the cap and disposed in a position so that when pivoting arm 36 is in the upper position which corresponds to a closed position of the valve (FIG. 1), the rod is adjacent to connecting rod appendage 72 and disposed at an angle with respect thereto. With the valve actuating rod arranged as shown in FIGS. 1 and 5, cap 58 may be turned (in a counterclockwise direction, as shown in FIG. 5) with respect to connecting rod 40 to bring the end of the valve-actuating rod into contact with the appendage 72 in the connecting rod. As the cap is turned, inner cap sidewall 62 and outer cap sidewall 64 slide with respect to inner housing wall 14, and angled rod 74 will slide above the appendage (see FIG. 3). As this occurs, the angled rod will force the appendage downwardly and thereby lower arm 36 from its upper position which corresponds to the closed position of the valve (FIG. 1) to a lower position which opens the valve and permits water to flow from the external source into the bowl (FIG. 3).

The preferred valve assembly may be incorporated into a birdbath, such as birdbath 24 of FIG. 4. This birdbath includes bowl 23, which is adapted to hold water, and pedestal 78, on which the bowl is mounted. Pedestal 78 is preferably comprised of rigid PVC and thermally insulated (although such insulation is not shown) and it may be surrounded by a decorative shroud such as shroud 80. In addition, a slip coupling arrangement 81 may be provided at the base of the pedestal to provide stability and to permit provision for utilities below grade level 82. Valve assembly 110, similar to assembly 10 of FIGS. 1, 2, 3 and 5, is mounted above the pedestal so that at least a portion thereof extends into the bowl, as shown in FIG. 4. This preferred assembly includes housing 112, that is provided in a generally cylindrical configuration. At the base of the housing and within the pedestal is located water-tight bulkhead 118. Bulkhead 118, preferably comprised of aluminum, differs from bulkhead 18 of assembly 10 in that it incorporates a heating unit 84, the operation of which will be subsequently explained. Housing 112 and bulkhead 118 define a chamber 120 for containment of water. The housing is perforated with a plurality of holes 122, each of which is located above the bulkhead and positioned so that water in the chamber may flow through the holes and into bowl 23 of birdbath 24. Preferably, these holes in the housing are located below the desired water level 25 of the bowl, and are spaced at regular intervals around the housing.

The valve assembly also includes a supply tube (not shown), which is adapted for connection to an external source of water through pipe 126 in a manner known to those skilled in the art to which the invention relates. The supply tube has an opening therein (also not shown) that is located within the chamber for passage of water from the external source into the chamber. Preferably, supply tube 126 is mounted so as to extend through the bulkhead for connection with an external source of water (not shown) within the pedestal.

The valve assembly also includes a valve seat (not shown) that is in fluid communication with the supply tube and located between the connection to the external source of water and the opening for passage of water into the chamber. A valve (also not shown) is seated in the valve seat and adapted to be moved from an open position, which permits the flow of water from the external source through the supply tube and through the opening therein into the chamber, to a closed position which stops the passage of water from the external source through the opening in the supply tube.

Assembly 110 also includes float 132, which is adapted to rise and fall within the chamber depending on the level of water in the chamber. Furthermore, because of fluid communication between the chamber and the bowl through holes 122, the level of water in the chamber will correspond to the level of water in the bowl. Therefore, float 132 will rise and fall in the chamber with changes in the level of water in the bowl.

Valve assembly 110 also includes means for attaching the float to the valve so that a rise in the water level in the chamber which raises the float to a predetermined level corresponding to the desired level of water in the bowl will tend to move the valve from an open position to a closed position. Preferably, the valve is pivotally attached at first end 134 of elongate arm 136, so that the arm may be pivoted through a range from a lower position (such as the position of arm 36 of FIG. 2) in which the valve is open to an upper position (see FIG. 4) in which the valve is closed. As will be appreciated by those having ordinary skill in the art to which the invention relates, pivoting arm 136 is attached to the valve (not shown) and is adapted to pivot about pivot point 138 and thereby to pivot the valve in the valve seat within its housing. Connecting rod 140 is attached at one end thereof (at its lower end as viewed in FIG. 4) to the second end 142 of arm 136 and at the other end thereof (the upper end as viewed in FIG. 4) to float 132, so that a rise in the water level in the chamber which raises the float will raise the arm from the lower position which corresponds to an open position of the valve to an upper position which corresponds to a closed position of the valve (FIG. 4). As has been mentioned, the relative position of the float along connecting rod 140 may be adjusted, thereby to select a water level in the chamber at which the valve will open to permit a flow of water from the supply line into the chamber. A predetermined level of water in the chamber may thereby be selected to correspond to the desired level 25 of water in the bowl, and when such level is selected, the valve assembly may be employed to maintain the water in the bowl at the desired level.

The preferred valve assembly of FIG. 4 also includes a heating unit 84 that is mounted and controlled so as to prevent freezing of the water in the chamber, as well as in the supply tube and in the external source within the pedestal. Operation of such heating unit will permit water to be maintained in the bowl in a liquid state even when the ambient temperature falls well below the freezing point. Heating unit 84 includes boiler tube 86, which extends through water-tight bulkhead 118 into valve assembly housing 112. Because the boiler tube opens into chamber 120, it will be filled with water during normal operation of the valve assembly. Cartridge-type immersion heater 88, extending upwardly in tube 86, is adapted to heat the water in the tube. As water in the tube is heated, it rises, displacing cooler water above in chamber 120. This sets up a circulation which assures a relatively constant, warm water temperature within the chamber while the heating unit is operating. The hot water-filled tube extending below the bulkhead also serves to provide heat by convection to adjacent components of the birdbath, including supply pipe 126, and bulkhead 118. Cartridge-type immersion heaters are known, especially for use in connection with photograph developing processes. Good results may be obtained in connection with the invention when a heating unit such as the Model C-6400 heating unit manufactured by Vulcan Electric Company is used. The heating unit is preferably connected through grounded connector 90 to an ordinary household electrical system providing 115V AC electricity. Furthermore, a disc-type thermostat 92, such as is manufactured and sold as the 37T Series thermostat by Therm-O-Disc, Inc., may be employed to regulate the heating unit. Preferably, the thermostat will be located within shroud 80 but outside of insulated pedestal 78 and electrically connected by a known method to the heating unit (although such connection is not shown in the drawings). If the pedestal and shroud are provided in the form of an ornamental concrete structure (not shown), it is preferred that an orifice be provided through the exterior of the structure to permit ambient air to contact the thermostat. Preferred results may be obtained when the thermostat is selected so as to activate heating unit 84 when the ambient temperature falls to about 35° F., and to turn the unit off when the ambient temperature rises to about 44° F. To prevent overheating in the event that the water supply is interrupted to the birdbath, the preferred heating unit is provided with a cut-off thermostat (not shown) that interrupts power to heater 88 when it reaches a temperature of approximately 230° F. The cut-off thermostat will restore power to the heater when its temperature falls to about 190° F.

Valve assembly 110 also includes means for retarding the closing of the valve as the water level in the chamber reaches the predetermined level therein corresponding to the desired level of water in the bowl. This retarding means includes cap 158 for the housing having vent hole 160 therethrough. This cap is substantially the same as cap 58 of assembly 10, although it also includes ornamental finial 94 having a passage therethrough for continuation of the vent hole. Cap 158 is adapted to mate with the housing so as to permit the air in the chamber above the water level to be compressed as the level of water rises therein. Vent hole 160 is sized so as to delay the equalization of the air pressure in the chamber and to permit the air above the water level in the chamber to be vented from the chamber at a controlled rate as the air is compressed by the rising water in the chamber. This controlled venting of air from the chamber will maintain a compression force on the upper surface of float 132, and on the surface of the water in the chamber, as the water rises therein. This force will act to retard the closing of the valve for a predetermined period so as to permit water to flow into the bowl in a quantity greater than that required to fill the bowl to the desired level so that a predetermined quantity of water will overflow the bowl when the valve is actuated to permit the flow of water to the bowl and before the valve is moved to a closed position.

Preferably, valve assembly 110 of birdbath 24 is provided with the preferred features of valve assembly 10. For example, although such features are not shown in FIG. 4, it is preferred that cap 158 include an end wall and a downwardly depending sidewall, and that the inside of the cap sidewall be provided with a relief groove that is adapted to permit air to enter the chamber when the valve is in a closed position. Furthermore, it is also preferred that cap 158 be provided with a central hole and a plug 166 which is adapted to fit within the central hole, and that the vent hole 160 be provided through the plug.

Preferably, valve assembly 110 includes float 132, that is provided with a channel extending therethrough, similar to that of float 32 of assembly 10. Guide rod 154, similar to guide rod 54 of assembly 10, may be provided for cooperation with the float to maintain the float in vertical alignment within the chamber.

Preferably, although not shown in FIG. 4, valve assembly 110 of birdbath 24 is also provided with a valve-actuating means for manually opening the valve to permit a flow of water into the bowl. Such valve-actuating means may be substantially the same as the valve-actuating means described herein in connection with valve assembly 10.

The preferred valve assembly also includes a siphon assembly, also shown in FIG. 4, which may be operated to continually siphon water from the bowl in order to insure that the valve assembly is automatically operated from time to time to insure that the water in the bowl remains fresh. The siphon assembly includes a siphoning port 95 through the valve assembly housing 112 at a point below the predetermined level corresponding to the desired level 25 of water in the bowl, which port is in fluid communication with the chamber. A siphoning tube 96 is also provided, having a first end 97 and a second end 98. The first end is connected to the siphoning port and the second end is disposed outside the bowl at a point below the first end. The siphon assembly also includes a siphon control valve 99, which is mounted within the siphoning tube so as to control the flow of water therethrough. Siphon control valve 99 must also be located below the lowest level at which water will be maintained in the bowl, and as shown in FIG. 4, is preferably mounted at second end 98 of the siphoning tube.

By adjusting the rate of flow of water through the tube using control valve 99, water may be siphoned from the chamber at a controlled rate. As water is siphoned from the chamber, the level in the chamber will drop and the automatic valve-actuating system will be activated to supply additional water to the chamber, and this additional water will flow through holes 122 into the bowl.

Figure 10:
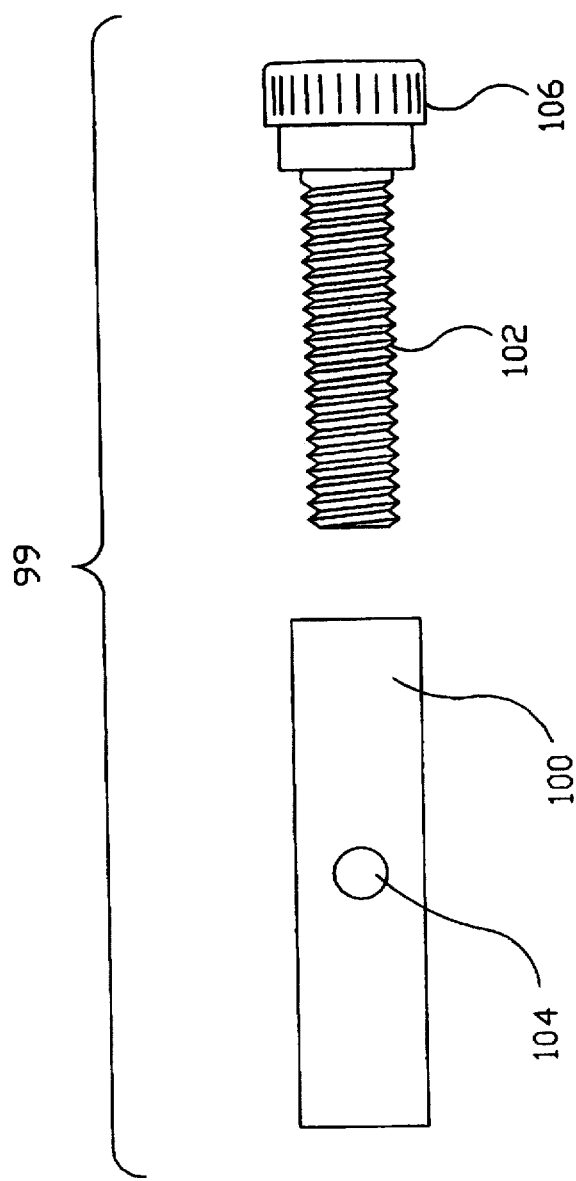
FIG. 10 is an exploded plan view of siphon control valve of a preferred embodiment of the invention.
Figure 11:
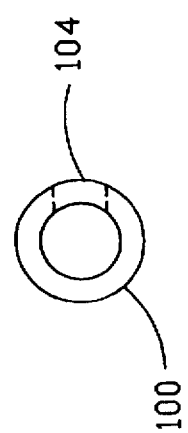
FIG. 11 is an end view of a portion of the siphon control valve of FIG. 10.

The type and size of tubing for use as the siphoning tube will depend on the size of the bowl and the circumstances in which it is used. For a birdbath such as is shown in FIG. 4, ordinary aquarium airline tubing may be used. In addition, the siphon control valve must be sized for the size of tubing used. A needle-type valve may be used, although an alternative embodiment which is preferred is shown in FIGS. 4, 10 and 11. Valve 99 is comprised of two components, sleeve 100 and bolt 102. The sleeve is internally tapped, and the bolt is appropriately sized so that the bolt may fit tightly within the sleeve. Bolt 102 is also threaded and provided with a knurled grip 106 so that the bolt may be turned to advance or withdraw it within the sleeve.

Sleeve 100 is also provided with a hole 104 through its side, which hole is located so that the bolt may seal hole 104 if the bolt is advanced into the sleeve, and alternatively that the bolt may reveal or open the hole if the bolt is withdrawn partway out of the sleeve. When used in connection with ordinary aquarium airline tubing, good results have been obtained when the sleeve is the nylon sleeve sold by Midwest Fastener Corporation of Dayton, Ohio, that is sold as Midwest Part No. 83951. This sleeve is made from nylon and is sized so as to be one inch long with an internal diameter of 0.115 inch. A 0.062 inch diameter hole is provided through the wall of the sleeve, as shown in FIGS. 10 and 11. The sleeve is tapped with a 6-32 tap, and is preferably used in conjunction with Midwest Fastener Corporation's Part No. 81576, an 8-32×⅝₁₆ inch aluminum bolt.

Although this description contains many specifics, these should not be construed as limiting the scope of the invention but as merely providing illustrations of some of the presently preferred embodiments thereof, as well as the best mode contemplated by the inventor of carrying out the invention. The invention, as described herein, is susceptible to various modifications and adaptations, and the same are intended to be comprehended within the meaning and range of equivalents of the appended claims.

What is claimed is:

1. A valve assembly that is adapted to be mounted in a bowl which is adapted to contain liquid, said valve assembly comprising:

(a) a housing having a liquid-tight bulkhead at the base thereof, said housing and bulkhead defining a chamber for containment of the liquid, wherein the housing has a plurality of holes, each of which is located above the bulkhead and positioned so that liquid in the chamber may flow through the holes and into the bowl;

(b) a supply tube which is adapted for connection to an external source of the liquid, said tube having an opening therein that is located within the chamber for passage of the liquid from the external source into the chamber;

(c) a valve seat that is in fluid communication with the supply tube and located between the connection to the external source of the liquid and the opening for passage of the liquid into the chamber;

(d) a valve which is seated in the valve seat and adapted to be moved from an open position, which permits the flow of the liquid from the external source through the supply tube and through the opening therein into the chamber, to a closed position which stops the passage of the liquid from the external source through the opening in the supply tube;

(e) a float which is adapted to rise and fall within the chamber depending on the level of the liquid in the chamber;

(f) means for attaching the float to the valve so that a rise in the level of liquid in the chamber which raises the float to a predetermined level corresponding to the desired level of liquid in the bowl will tend to move the valve from an open position to a closed position; and (g) means for retarding the closing of the valve as the level of liquid in the chamber reaches the predetermined level therein corresponding to the desired level of liquid in the bowl, said retarding means including a cap for the housing having a vent hole therethrough, said cap being adapted to mate with the housing so as to permit the air in the chamber above the water level to be compressed as the level of liquid rises therein, and said vent hole being sized so as to permit the air above the level of liquid in the chamber to be vented from the chamber at a controlled rate as the air is compressed to retard the closing of the valve for a predetermined period so as to permit the liquid to flow into the bowl in a quantity greater than that required to fill the bowl to the desired level so that a predetermined quantity of the liquid will overflow the bowl when the valve is actuated to permit the flow of the liquid to the bowl and before the valve is moved to a closed position.

2. The valve assembly of claim 1, wherein the holes in the housing are located below the desired liquid level of the bowl.

3. The valve assembly of claim 1, wherein the holes in the housing are spaced at regular intervals around the housing.

4. The valve assembly of claim 1, which is provided with a heating element and a thermostat that are adapted to prevent the liquid in the chamber and the bowl from freezing.

5. The valve assembly of claim 1, wherein the housing is generally cylindrical.

6. The valve assembly of claim 1, wherein the cap includes an end wall and a downwardly depending sidewall, and wherein the inside of the sidewall is provided with a relief groove that is adapted to permit air to enter the chamber when the valve is in the closed position.

7. The valve assembly of claim 1, wherein the cap is provided with a central hole and a plug which is adapted to fit within said central hole, and wherein the vent hole is provided through the plug.

8. The valve assembly of claim 1 which includes a siphon assembly comprising:

(a) a siphoning port through the housing at a point below the predetermined level corresponding to the desired level of liquid in the bowl, which port is in fluid communication with the chamber;

(b) a siphoning tube having a first end and a second end, said first end being connected to the siphoning port and said second end being disposed outside the bowl at a point below said first end; and (c) a siphon control valve which is mounted within said siphoning tube so as to control the flow of liquid therethrough, so that liquid may be siphoned from the chamber at a controlled rate.

9. The valve assembly of claim 1, which includes a guide rod which cooperates with the float to maintain the float in vertical alignment within the chamber.

10. The valve assembly of claim 9, wherein the float is provided with a channel extending therethrough and the guide rod is disposed within the channel in sliding relationship therewith.

11. The valve assembly of claim 8, wherein:

(a) the valve is pivotally attached to an elongate arm at a first end thereof so that the arm may be pivoted through a range from a lower position in which the valve is open to an upper position in which the valve is closed; and (b) a connecting rod is attached at one end thereof to the second end of the arm and at the other end thereof to the float, so that a rise in the liquid level in the chamber which raises the float will raise the arm from the lower position which corresponds to an open position of the valve to the upper position which corresponds to a closed position of the valve.

12. The valve assembly of claim 11, which is provided with a valve-actuating means for manually opening the valve to permit a flow of liquid into the bowl, which valve-actuating means comprises:

(a) an appendage in the connecting rod at a medial location along the length thereof;

(b) a valve-actuating rod that is attached to the cap and disposed so that when the arm is in the upper position which corresponds to a closed position of the valve, said rod is adjacent to the appendage and disposed at an angle with respect thereto, so that the cap may be turned with respect to the connecting rod to bring the end of the valve-actuating rod into contact with the appendage in the connecting rod and to slide the angled rod above the appendage to lower the arm from its upper position which corresponds to the closed position of the valve to a lower position which opens the valve and permits the liquid to flow from the external source into the bowl.

13. A birdbath comprising:

(a) a bowl which is adapted to hold water;

(b) a pedestal on which the bowl is mounted;

(c) a valve assembly that is mounted above the pedestal so that at least a portion thereof extends into the bowl, said valve assembly comprising:

(i) a housing having a water-tight bulkhead at the base thereof, said housing and bulkhead defining a chamber for containment of water, wherein the housing has a plurality of holes, each of which is located above the bulkhead and positioned so that water in the chamber may flow through the holes and into the bowl;

(ii) a supply tube which is adapted for connection to an external source of water, said tube having an opening therein that is located within the chamber for passage of water from the external source into the chamber;

(iii) a valve seat that is in fluid communication with the supply tube and located between the connection to the external source of water and the opening for passage of water into the chamber;

(iv) a valve which is seated in the valve seat and adapted to be moved from an open position, which permits the flow of water from the external source through the supply tube and through the opening therein into the chamber, to a closed position which stops the passage of water from the external source through the opening in the supply tube;

(v) a float which is adapted to rise and fall within the chamber depending on the level of water in the chamber;

(vi) means for attaching the float to the valve so that a rise in the water level in the chamber which raises the float to a predetermined level corresponding to the desired level of water in the bowl will tend to move the valve from an open position to a closed position; and (vii) means for retarding the closing of the valve as the water level in the chamber reaches the predetermined level therein corresponding to the desired level of water in the bowl, said retarding means including a cap for the housing having a vent hole therethrough, said cap being adapted to mate with the housing so as to permit the air in the chamber above the water level to be compressed as the level of water rises therein, and said vent hole being sized so as to permit the air above the water level in the chamber to be vented from the chamber at a controlled rate as the air is compressed to retard the closing of the valve for a predetermined period so as to permit water to flow into the bowl in a quantity greater than that required to fill the bowl to the desired level so that a predetermined quantity of water will overflow the bowl when the valve is actuated to permit the flow of water to the bowl and before the valve is moved to a closed position;

(d) a heater that is mounted and controlled so as to prevent the water in the birdbath from freezing.

14. The birdbath of claim 13, wherein the supply tube is mounted so as to extend through the bulkhead for connection with an external source of water within the pedestal, and wherein the heater is mounted and controlled so as to prevent freezing of the water in the supply tube and in the external source within the pedestal.

15. The birdbath of claim 13, wherein the cap includes an end wall and a downwardly depending sidewall, and wherein the inside of the sidewall is provided with a relief groove that is adapted to permit air to enter the chamber when the valve is in a closed position.

16. The birdbath of claim 13, wherein the cap is provided with a central hole and a plug which is adapted to fit within said central hole, and wherein the vent hole is provided through the plug.

17. The birdbath of claim 13 which includes a siphon assembly comprising:

(a) a siphoning port through the housing at a point below the predetermined level corresponding to the desired level of water in the bowl, which port is in fluid communication with the chamber;

(b) a siphoning tube having a first end and a second end, said first end being connected to the siphoning port and said second end being disposed outside the bowl at a point below said first end; and (c) a siphon control valve which is mounted within said siphoning tube so as to control the flow of water therethrough, so that water may be siphoned from the chamber at a controlled rate.

18. The birdbath of claim 13, wherein the float is provided with a channel extending therethrough and a guide rod is provided for cooperation with the float to maintain the float in vertical alignment within the chamber, said guide rod being disposed within the channel in sliding relationship therewith.

19. The birdbath of claim 18, wherein:

(a) the valve is pivotally attached to an elongate arm at a first end thereof so that the arm may be pivoted through a range from a lower position in which the valve is open to an upper position in which the valve is closed; and (b) a connecting rod is attached at one end thereof to the second end of the arm and at the other end thereof to the float, so that a rise in the water level in the chamber which raises the float will raise the arm from the lower position which corresponds to an open position of the valve to the upper position which corresponds to a closed position of the valve.

20. The birdbath of claim 19, which is provided with a valve-actuating means for manually opening the valve to permit a flow of water into the bowl, which valve-actuating means comprises:

(a) an appendage in the connecting rod at a medial location along the length thereof;

(b) a valve-actuating rod that is attached to the cap and disposed so that when the arm is in the upper position which corresponds to the closed position of the valve, said rod is adjacent to the appendage and disposed at an angle with respect thereto, so that the cap may be turned with respect to the connecting rod to bring the end of the valve-actuating rod into contact with the appendage in the connecting rod and to slide the angled rod above the appendage to lower the arm from its upper position which corresponds to the closed position of the valve to a lower position which opens the valve and permits water to flow from the external source into the bowl.

* * * * *